United States Patent
Nijland et al.

(10) Patent No.: US 11,332,271 B2
(45) Date of Patent: May 17, 2022

(54) FILLING DEVICE FOR FILLING A HOLDER WITH VULNERABLE PRODUCTS, AND METHOD THEREFOR

(71) Applicant: DE GREEF'S WAGEN-, CARROSSERIE- EN MACHINEBOUW B.V, Tricht (NL)

(72) Inventors: Wilhelm Jan Nijland, Veenendaal (NL); Hendrik Jan Van Ooijen, Bruchem (NL); Harm-Jan De Bruin, Leerdam (NL)

(73) Assignee: DE GREEF'S WAGEN-, CARROSSERIE- EN MACHINEBOUW B.V, Tricht (NL)

( * ) Notice: Subject to any disclaimer, the term of this patent is extended or adjusted under 35 U.S.C. 154(b) by 374 days.

(21) Appl. No.: 15/577,255

(22) PCT Filed: May 19, 2016

(86) PCT No.: PCT/NL2016/050356
§ 371 (c)(1),
(2) Date: Nov. 27, 2017

(87) PCT Pub. No.: WO2016/190731
PCT Pub. Date: Dec. 1, 2016

(65) Prior Publication Data
US 2018/0162571 A1 Jun. 14, 2018

(30) Foreign Application Priority Data
May 28, 2015 (NL) ..................................... 2014878

(51) Int. Cl.
*B65B 25/04* (2006.01)
*B65G 15/44* (2006.01)
*B65G 21/12* (2006.01)

(52) U.S. Cl.
CPC ............ *B65B 25/046* (2013.01); *B65G 15/44* (2013.01); *B65G 21/12* (2013.01); *B65G 2201/0211* (2013.01)

(58) Field of Classification Search
CPC ..... B65B 25/046; B65B 37/005; B65B 25/04; B65B 25/045; B65G 15/44; B65G 21/12;
(Continued)

(56) References Cited

U.S. PATENT DOCUMENTS

| 882,795 A | 3/1908 | Paul |
| 1,617,490 A | 2/1927 | Knox |

(Continued)

FOREIGN PATENT DOCUMENTS

| WO | 0012415 A1 | 3/2000 |
| WO | 2016190731 A1 | 12/2016 |

OTHER PUBLICATIONS

International Search Report and Written Opinion dated Sep. 6, 2016 in International Patent Application No. PCT/NL2016/050356, 8 pages.

*Primary Examiner* — Chelsea E Stinson
*Assistant Examiner* — Scott A Howell
(74) *Attorney, Agent, or Firm* — Shook, Hardy & Bacon L.L.P.

(57) ABSTRACT

The invention relates to a filling device (2) for filling a holder with vulnerable products, for instance apples, and a method therefor. The filling device according to the invention comprises: —a main frame (14) provided with an elevator conveyor (4) with a supply side (10) and a filling side (12); —a distributing device (28) connected operatively to the filling side of the elevator conveyor and provided with one or more distributors configured to distribute products over the holder; —height adjusting means (42,44) configured to move the distributing device in the height relative to
(Continued)

the holder such that the distributing device is movable in the height during filling of the holder; and—a supply side guide arranged (66,68,70) on the main frame (14) for operation with the height adjusting means and configured to align the supply side of the elevator conveyor with a delivery end of a feed conveyor during a movement of the distributing device in the height.

20 Claims, 8 Drawing Sheets

(58) Field of Classification Search
CPC ............ B65G 2201/0211; B65G 21/14; B65G 2812/02227; B65G 47/56; B65G 13/12; B65G 17/26; B65G 41/002; B65G 45/005; B65G 25/046; B65G 41/001; B65G 41/005
USPC .............................................. 53/475; 198/318
See application file for complete search history.

(56) References Cited

U.S. PATENT DOCUMENTS

| | | | | |
|---|---|---|---|---|
| 2,559,192 A * | 7/1951 | Jarige | ................... | B65G 65/00 198/521 |
| 2,994,894 A * | 8/1961 | Loomis | .............. | B65G 69/2858 14/71.3 |
| 3,147,846 A * | 9/1964 | Huntoon | ................ | B65B 25/046 53/248 |
| 3,302,770 A * | 2/1967 | Schwalm | ................ | A01D 90/10 198/632 |
| 3,982,625 A * | 9/1976 | Wentz | .................... | B65G 47/50 198/572 |
| 5,090,550 A * | 2/1992 | Axmann | ................ | B65G 21/10 198/311 |
| 6,421,985 B1 * | 7/2002 | Simmons, Jr. | ........ | B31D 5/0047 53/472 |
| 7,472,785 B2 * | 1/2009 | Albright | ................ | A01K 5/004 198/369.2 |
| 7,584,834 B2 * | 9/2009 | Wood | .................... | B65G 37/00 198/312 |
| 8,333,051 B2 * | 12/2012 | Grentz | .................. | B65B 25/041 53/244 |
| 8,464,859 B2 * | 6/2013 | Campbell | .............. | B65G 13/12 198/588 |
| 2008/0105520 A1 * | 5/2008 | Albright | ................ | A01K 5/004 198/861.3 |
| 2012/0005986 A1 | 1/2012 | Grentz et al. | | |
| 2015/0101910 A1 * | 4/2015 | Cribiu | .................. | B65G 41/001 198/592 |

* cited by examiner

FILLING DEVICE FOR FILLING A HOLDER WITH VULNERABLE PRODUCTS, AND METHOD THEREFOR

CROSS-REFERENCE TO RELATED APPLICATIONS

This application claims priority under 35 U.S.C. § 365 to PCT/NL2016/050356, filed on May 19, 2016, entitled "FILLING DEVICE FOR FILLING A HOLDER WITH VULNERABLE PRODUCTS, AND METHOD THEREFOR," which claims priority to Netherlands App. No. 2014878 filed on May 28, 2015, the entirety of the aforementioned applications are incorporated by reference herein.

The present invention relates to a filling device for filling a holder with products, in particular vulnerable products. Such holders are for instance cases, containers, octabins and the like. The vulnerable products are for instance potatoes, vegetables and fruit, more particularly fresh fruit which is susceptible to damage during handling thereof, such as apples and pears.

NL 1026073 and EP 1740465 describe a conventional filling device wherein products are supplied via a feed conveyor to a feed belt. From the feed belt the products roll or drop into a rotating brush with which the products are then transferred to a so-called disc distributor. From this disc distributor the products are distributed as uniformly as possible into for instance a case. In order to limit the vertical distance from the distributor to the height of the product in the case, and thereby prevent damage to the products, the case is moved in the height. An empty case is lifted up here, after which products are placed on or close to the bottom of the case. During the filling process the case moves to an increasingly lower position by lowering the case so that the drop distance remains limited during the whole filling process. The case is placed here on a forklift truck or other lifting device.

It is found in practice that particularly the positioning of a case yet to be filled in or close to the filling device take some time such that the supply system must usually even be brought to a stop. This limits the total processing capacity of the filling device.

The object of the present invention is to provide a greater capacity of the filling device, whereby in addition the same processing capacity can be achieved with fewer filling devices.

The present invention provides for this purpose a filling device for filling a holder with vulnerable products, the filling device comprising:

a main frame provided with an elevator conveyor with a supply side and a filling side;

a distributing device connected operatively to the filling side of the elevator conveyor and provided with one or more distributors configured to distribute products over the holder;

height adjusting means configured to move the distributing device in the height relative to the holder such that the distributing device is movable in the height during filling of the holder; and a supply side guide arranged on the main frame for operation with the height adjusting means and configured to align the supply side of the elevator conveyor with a delivery end of a feed conveyor during a movement of the distributing device in the height.

By providing an elevator conveyor products, in particular vulnerable products such as apples, pears and other sensitive products, are carried from a feed position on the supply side of the conveyor to a filling position on the filling side of the conveyor. The conveyor is preferably provided for this purpose with a conveyor belt, and more particularly with a so-called corrugated belt. Products can hereby be moved in relatively simple and safe manner. The elevator conveyor is preferably disposed here such that the products can be raised in the height such that they are then placeable with a distributing device into a holder, particularly into a case, or alternatively into a container, octabin or other holder.

The distributing device is arranged according to the invention on the filling side of the conveyor and is provided with one or more distributors configured to distribute products over the holder. The distributing device can be provided here as so-called disc distributor.

Using the distributing device the vulnerable products are distributed in effective and controlled manner over (a layer in) the holder. In a currently preferred embodiment the distributing device is provided here together with the filling side of the conveyor for movement in or on the main frame. The distributing device preferably also comprises a brush for receiving and subsequently placing products on an upper distributor, for instance in the form of a disc or dish, of the distributing device. The use of alternative distributing devices is likewise possible according to the invention. In a currently preferred embodiment a first upper distributor is provided with a number of spokes which extend substantially in a radial direction and on which flaps are provided. Using these rotating flaps the products are distributed over the second lower distributor in the form of a disc or dish in which an opening has been made. This lower disc rotates at a rotation speed differing from that of the upper disc, whereby different products always arrive at the opening in this lower distributor. These products preferably sink with flap through the opening, optionally onto another flap, and are subsequently placed in controlled manner in the holder. A uniform distribution of products over the holder is in this way realized. In addition, the placing over the layer of products in the holder is in this way carried out in a controlled manner, whereby damage to the product is avoided.

According to the invention the filling device is provided with height adjusting means which are configured to move the distributing device in the height relative to the holder. By means of the height adjusting means the distributing device, preferably together with the filling side of the elevator conveyor, is moved in the height during the filling process subject to the extent of filling of the holder. The distance between the distributing device, in particular the lower distributor thereof, and the uppermost layer of products in the holder can in this way be kept to a minimum. The height adjusting means are preferably height-adjustable in continuous manner here.

Using the height adjusting means in the filling device according to the invention the distributing device can be displaced substantially in vertical direction without a substantial displacement in a horizontal plane. An accurate positioning of the distributing device is hereby realized, whereby a better distribution of products in the holder is achieved, preferably with reduction of the risk of product damage.

The height adjusting means preferably comprise a guide track and a drive. The drive applied can for instance be hydraulic, electrical or pneumatic. The desired movement of the filling side of the conveyor and/or the distributing device can hereby be performed. The height adjusting means are preferably configured to move the distributing device and the filling side of the elevator conveyor together in the height. The filling side of this conveyor is preferably connected for this purpose to the distributing device so that they are movable in the height as a unit.

Because the filling side of the elevator conveyor is moved in the height, the angle of this conveyor to the horizontal, for instance the ground surface or the plane of movement of a feed conveyor, changes. This change of angle results on the supply side of the elevator conveyor in a change in the transfer of products between the feed conveyor and the elevator conveyor. Due to the change in height of the filling side the product, when entering the elevator conveyor on the supply side, will after all pass through a different angle in the direction of movement. There is therefore a risk of damage to the product here. Since the (vertical) height of the distributing device and filling side of the elevator conveyor is adjustable according to the invention over an appreciable height during the filling process, the effective distance and/or effective angle to the horizontal between the feed conveyor and the elevator conveyor, i.e. the distance and/or angle between the transfer of the product from the one conveyor to the other, are also in principle not constant. This would increase the risk of damage to the product.

According to the invention said problem with the transfer of products from the feed conveyor to the elevator conveyor is solved, or at least reduced, by providing the filling device with a supply side guide arranged on the main frame for operation with the height adjusting means. This supply side guide is configured to align the supply side of the elevator conveyor with a delivery end of a feed conveyor during a movement of the distributing device in the height. Achieved with this guide is that the transfer between the different conveyors can be performed in controlled manner. This greatly reduces, and preferably even wholly avoids the risk of damage to the product. Loss of quality of the product is hereby prevented as well as loss of storage life of the product.

The supply side guide according to the invention achieves that the distributing device is movable in the height in effective manner during the filling process without increasing the risk of damage to the product. In addition, providing the supply side guide achieves that the rotation point of the elevator conveyor is as it were movable in a preferably horizontal plane while the distributing device and filling side of the elevator conveyor are movable in the height in a substantially vertical direction during the filling process without a substantial horizontal displacement. The positioning of the products in the holder is hereby further improved compared to conventional filling devices.

In a currently preferred embodiment the supply side guide provides in use for an alignment of the supply side of the elevator conveyor and the delivery end of the feed conveyor, particularly by keeping the distance between them substantially constant during a filling process. An effective transfer of the vulnerable products is hereby achieved.

Providing a supply side guide with guide track avoids the feed conveyor having to pivot or rotate around a fixedly disposed shaft. It is hereby possible to optimize the connection between the feed conveyor and the elevator conveyor and to have the supply side of the elevator conveyor undergo a controlled movement during movement of the filling device in the height. This achieves that a good alignment and good connection of the two conveyors to each other is realized. This further reduces the risk of damage to the product.

In addition, providing a guide track achieves that the distributing device, together with the filling side of the feed conveyor, is preferably movable in the height in a substantially straight vertical line, since the supply side of the elevator conveyor is disposed movably via the guide track. In addition to providing a constant (transfer) distance, too abrupt a transition in the direction of movement of the supplied products can also be avoided as far as possible. The risk of damage to products is hereby reduced still further.

In an advantageous preferred embodiment according to the present invention the supply side guide comprises a guide curve which is configured such that the distance, more specifically the effective transfer distance of the products, between the delivery end of the feed conveyor and the supply side of the elevator conveyor remains substantially constant during the filling process.

Providing a guide curve instead of a straight guide track in the supply side guide achieves a further optimization of the transfer of products from feed conveyor to elevator conveyor. The elevator conveyor preferably extends here, as seen in the direction of movement of the products, some distance on either side of the supply side guide. The transfer of the products between the conveyors hereby becomes optimally adjustable in a greater range of possible positions of the distributing device and elevator conveyor.

In a further advantageous preferred embodiment according to the present invention the filling device comprises a supply controller provided with a product detector, wherein the supply controller is configured to control the elevator conveyor during positioning of the distributing device relative to a holder which has been filled or is yet to be filled such that the elevator conveyor fulfills a buffer function.

An optimal control of the elevator conveyor is made possible by providing a supply controller. It is thus possible with the supply controller according to the invention, during removal of a holder when the distributing device cannot place any products in a holder, to allow the feed conveyor to continue running. Using the product detector detection takes place of when a product is being supplied on the feed conveyor, after which the elevator conveyor is moved for a short interval of time and the feed conveyor can place the product onto the elevator conveyor. Following placing of the product the elevator conveyor can be brought to a stop by the supply controller until a subsequent product is detected. In this way the elevator conveyor can as it were be filled with products and thereby fulfil a buffer function. If desired, in addition to the buffering on the elevator conveyor, the distributing device, or distributor/distributing disc, can also be activated for a time in order to provide additional buffer capacity. During this buffering process a new holder can for instance be placed and the distributing device can be positioned, after which the filling process can be restarted and the supply controller sets the elevator conveyor into operation again in the usual manner during the filling process. The supply system with the feed conveyor can in this way continue to run during the whole process and unnecessary standstill is avoided. The whole capacity of the line is hereby further increased.

The supply controller is preferably also configured to additionally control the distributing device such that the distributing device, and in particular the distributing disc/distributors thereof, fulfils an additional buffer function. An additional buffering is hereby made possible.

In an advantageous preferred embodiment according to the present invention the filling device comprises a first filling position and a second filling position.

Providing the filling device with a first and a second filling position enables a further increase in the capacity of the filling device as a whole. During positioning of a new holder for filling, as well as during removal of a filled holder, the filling process can continue at the other filling position. It is also possible if desired to provide even more than two filling positions.

In an embodiment according to the invention with two or more filling positions the main frame is preferably provided for movement over a substructure in a direction substantially transversely of the direction of movement of the product on the elevator conveyor such that the distributing device is displaceable from a first holder in the first filling position to a second holder in the second filling position. The movement of the main frame from the first filling position to the second filling position can be performed in different ways. Use can be made here of guides, rails, wheels and/or bearings. It is also possible to displace the conveyor and distributing device inside the frame using a substructure or sub-frame. The capacity of the filling device as a whole can in this way be further increased.

In a further advantageous preferred embodiment according to the present invention the filling device also comprises a number of wheels for displacing the filling device.

Providing a number of wheels on the filling device enables the filling device to be moved in effective manner. A mobile filling device is in fact hereby obtained. The wheels can also be used if desired in an embodiment wherein there are two or more filling positions. A user-friendly and flexibly deployable filling device is hereby provided.

The present invention also relates to a method for filling a holder with vulnerable products, comprising of:
 providing a filling device as described above;
 placing the holder;
 supplying the products with a feed conveyor;
 filling the holder, wherein the distributing device is moved in height direction during the filling and wherein during movement of the distributing device in the height direction the positions of the supply side of the elevator conveyor and the delivery end of a feed conveyor are aligned using the supply side guide; and
 controlling the elevator conveyor with a supply controller such that the elevator conveyor functions as buffer.

The method provides the same advantages and effects as described for the filling device.

Particularly achieved with the method is that a greater capacity of the filling process is provided with a single filling device, in particular preferably in combination with a reduction in the risk of product damage or product loss.

The method according to the invention preferably provides for an alignment between the delivery end of the feed conveyor and the supply side of the elevator conveyor, wherein the distance between the two preferably remains substantially constant during a filling process. Use is preferably made here of a guide track in the form of a guide curve in order to have the movement of the elevator conveyor on the supply side take place as well as possible.

A buffer function is also provided on the elevator conveyor using a supply controller. The feed conveyor can preferably continue to operate here for a determined time during changing of a holder and, using the supply controller and a product detector, the elevator conveyor is moved for the purpose of receiving a product and then stopped again until the following product is supplied. A holder can in this way be changed and/or the distributing device can be moved from a first to a second filling position. Standstill in the supply line is hereby avoided.

In a further advantageous embodiment according to the invention the filling device comprises on or close to the distributing device an ultrasonic sensor configured to measure a filling height of the holder.

Providing an ultrasonic sensor achieves that the height of the bottom of the case and/or the filling height in the case can be measured, on the basis of which the height of the filling head can then preferably be automatically determined and controlled. Because contact between for instance a brush under the distributing device and the products is hereby avoided, the risk of abrasion damage is reduced. In said embodiment according to the invention the ultrasonic sensor is preferably mounted under the distributing disc of the distributing device. The ultrasonic sensor transmits sound waves downward and thus measures the distance between the distributing disc and the surface thereunder, i.e. the bottom of the case or the top of the filling of the case consisting of fruits, for instance apples or pears.

Further advantages, features and details of the invention are elucidated on the basis of preferred embodiments thereof, wherein reference is made to the accompanying drawings, in which.

Figure 1:
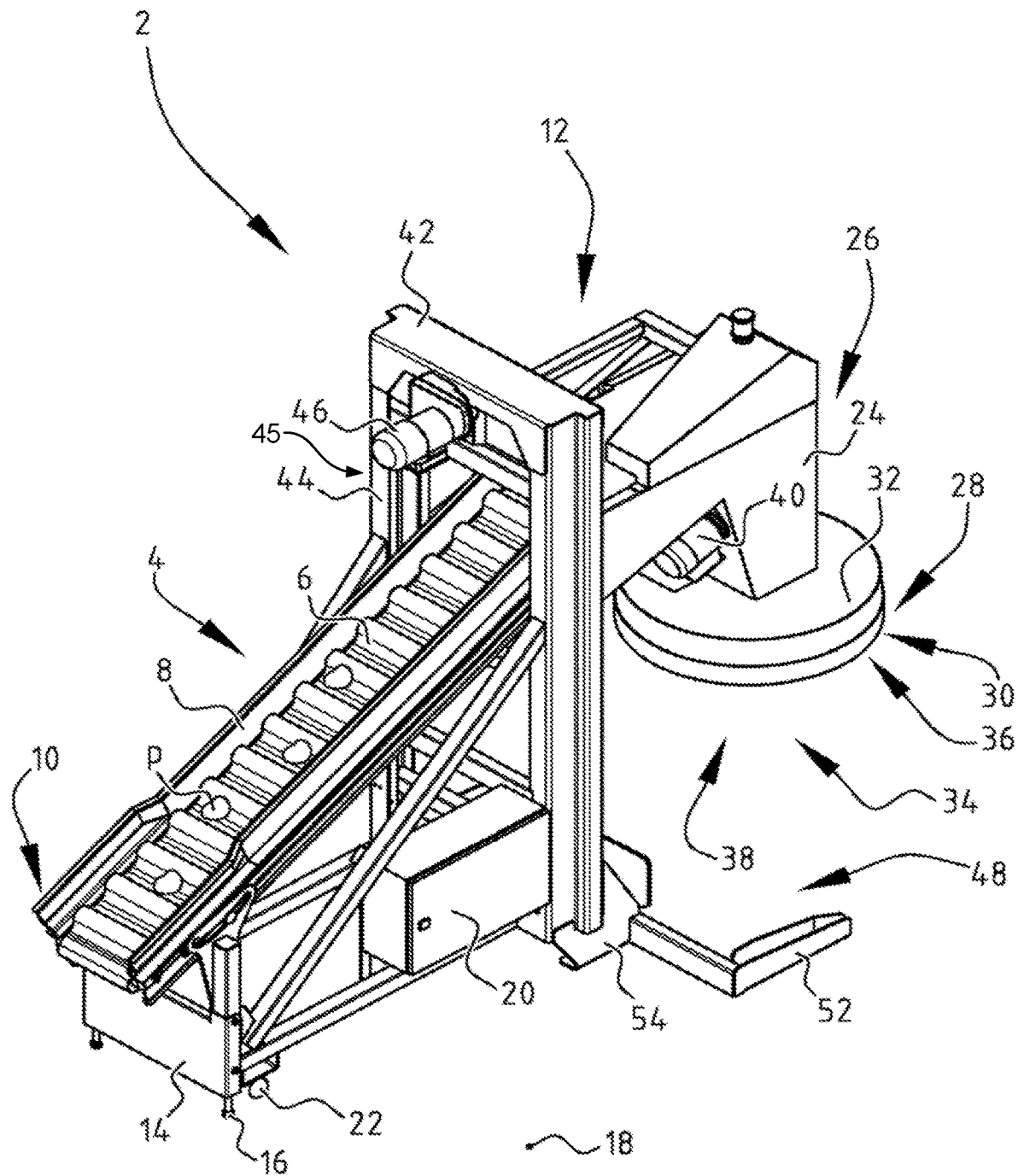
FIG. 1 is a view of a filling device according to the invention.

Filling device 2 (FIG. 1) is provided with elevator conveyor 4, comprising corrugated belt 6 with side walls 8. Conveyor 4 has supply side 10 and filling side 12. Conveyor 4 is supported in frame 14 which is placed using feet 16 on ground surface 18. Control box 20 is provided here on frame 14. A number of wheels 22 are optionally provided on frame 14 to enable simple displacement of filling device 2 after screwing or folding in of foot 16.

Situated inside brush cover 24 on filling side 12 of elevator conveyor 4 is receiving brush 26 for receiving and subsequently placing products in distributing device 28. Distributing device 28 comprises a first disc 30 provided with a number of spokes 32 with flap 34, and a lower disc 36 provided with an opening 38. Distributing device 28 is driven here using motor 40.

In the shown embodiment, filling device 2 is provided with a portal construction 42 that includes a height adjuster 45 with two guides 44 and a drive 46 for moving the filling side 12 of conveyor 4 in the height together with distributor 28.

In the shown embodiment filling device 2 is provided with a first filling position 48 and a second filling position 50 (see also FIGS. 3, 4, 5 and 6). Filling device 2 is provided for this purpose with substructure 52 over which main frame 14 is displaceable using guides or support elements 54.

Figure 2:
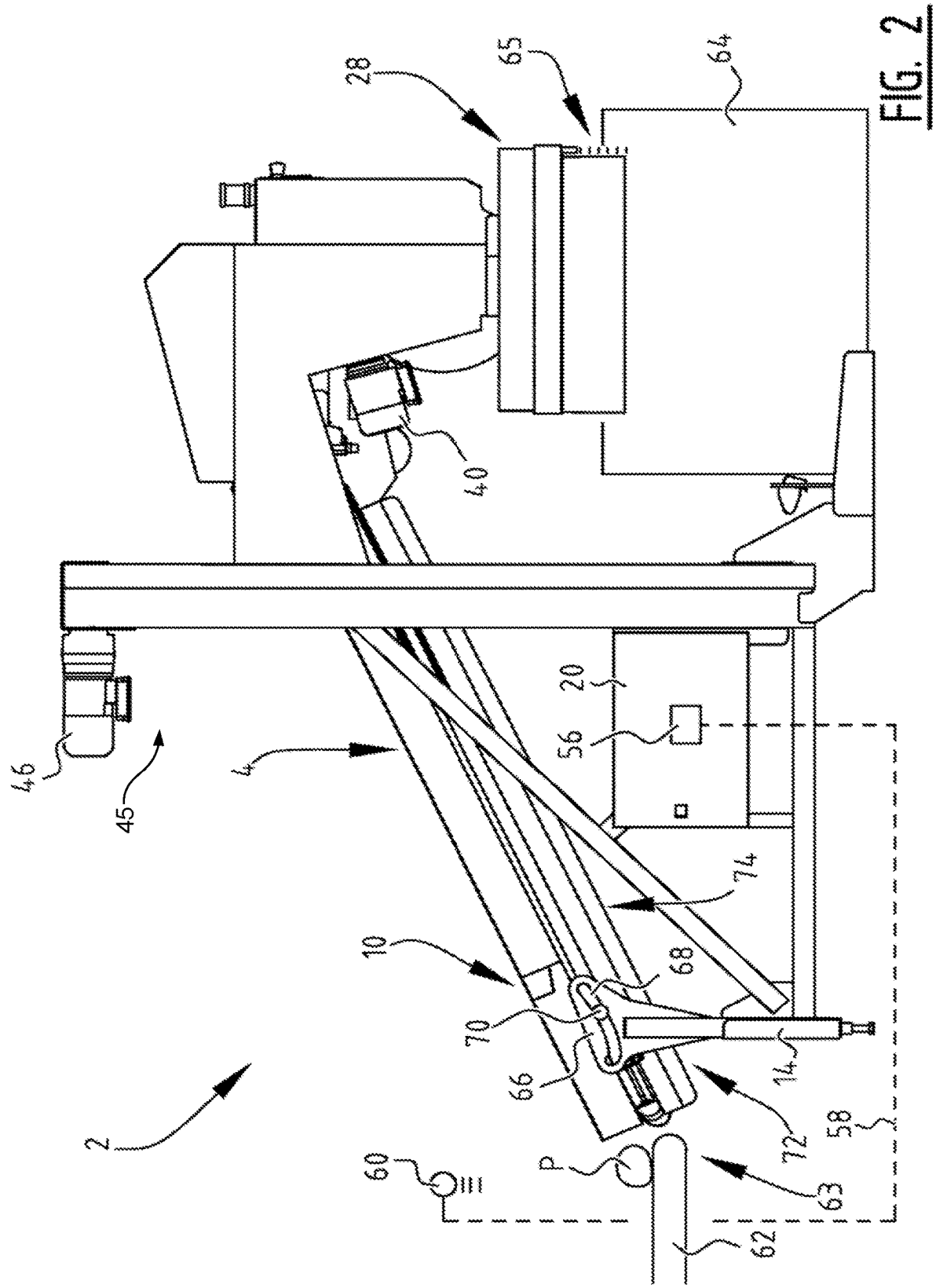
FIG. 2 is a side view of the filling device of FIG. 1.
Figure 3:
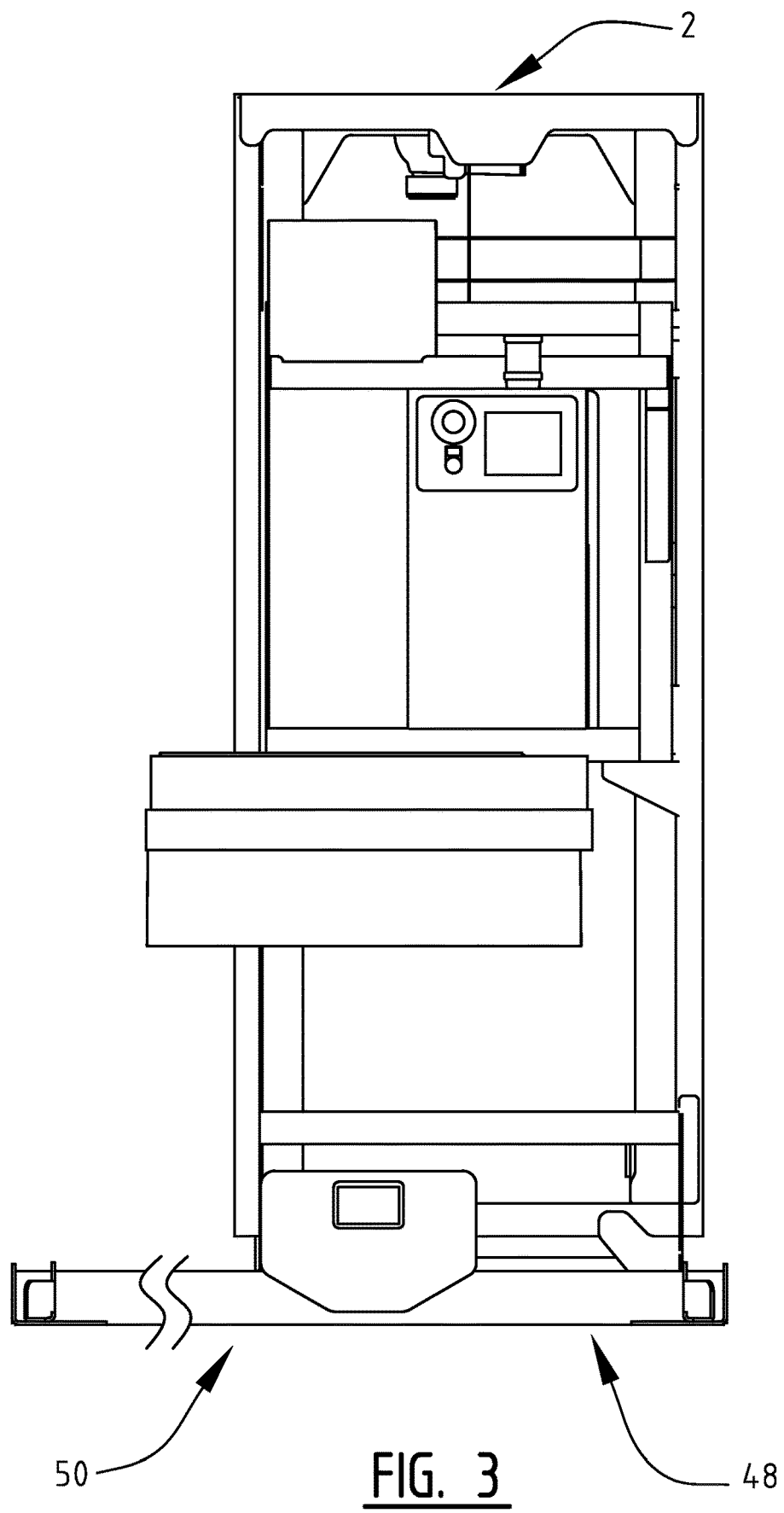
FIG. 3 is a view on the filling side of the filling device of FIG. 1.
Figure 4:
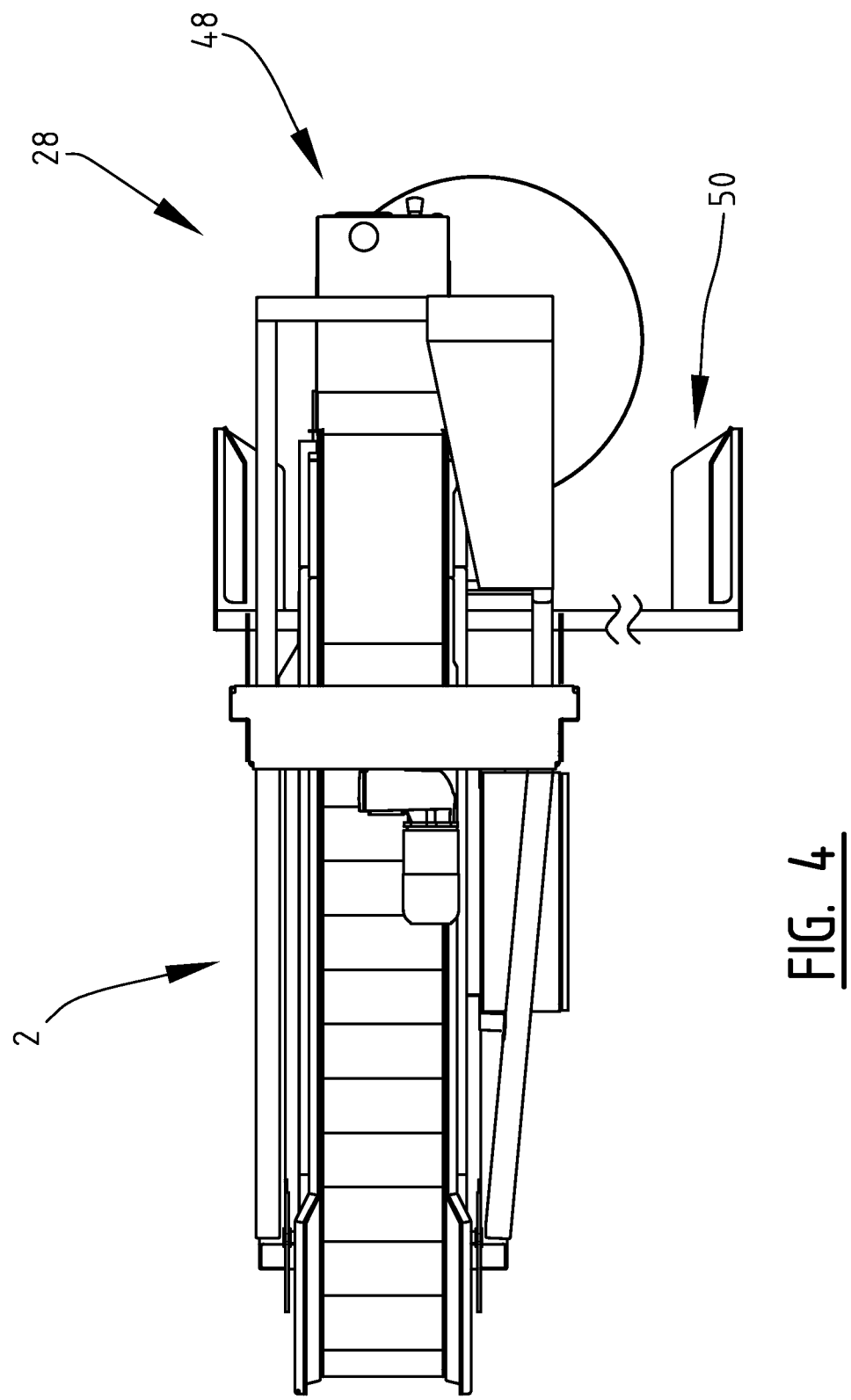
FIG. 4 is a top view of the filling device of FIG. 1, also showing schematically a second filling position.

In the shown embodiment filling device 2 is provided with control box 20 in which controller 56 (FIG. 2) is arranged. Controller 56 receives measurement signal 58 from product detector 60 which detects a product P on feed conveyor 62 with delivery side 63. Controller 56 then actuates drives 40, 46. In the shown embodiment motor 40 is connected operatively to belt 4 and brush 26 so that an optimal alignment of the supply of products P is provided during filling of case 64 with products P.

In the shown embodiment frame 14 is provided on supply side 10 with fixedly disposed guide 66 in which a curved guide track 68, or guide curve, is provided (FIGS. 2, 7A-B and 8A-B). In the shown embodiment supply side 10 is provided movably in guide track 68 using pin or shaft 70. Pin or shaft 70 functions here as rotation shaft for feed conveyor 4 with corrugated belt 6. Because of the movement in the height of distributing device 28, supply side 10 of elevator conveyor 4 will co-displace in track 68 such that an optimal alignment is provided between feed conveyor 62 and elevator conveyor 4. In the shown embodiment elevator conveyor 4 extends with respective parts 72, 74 some distance on either side of guide track 68.

Figure 5:
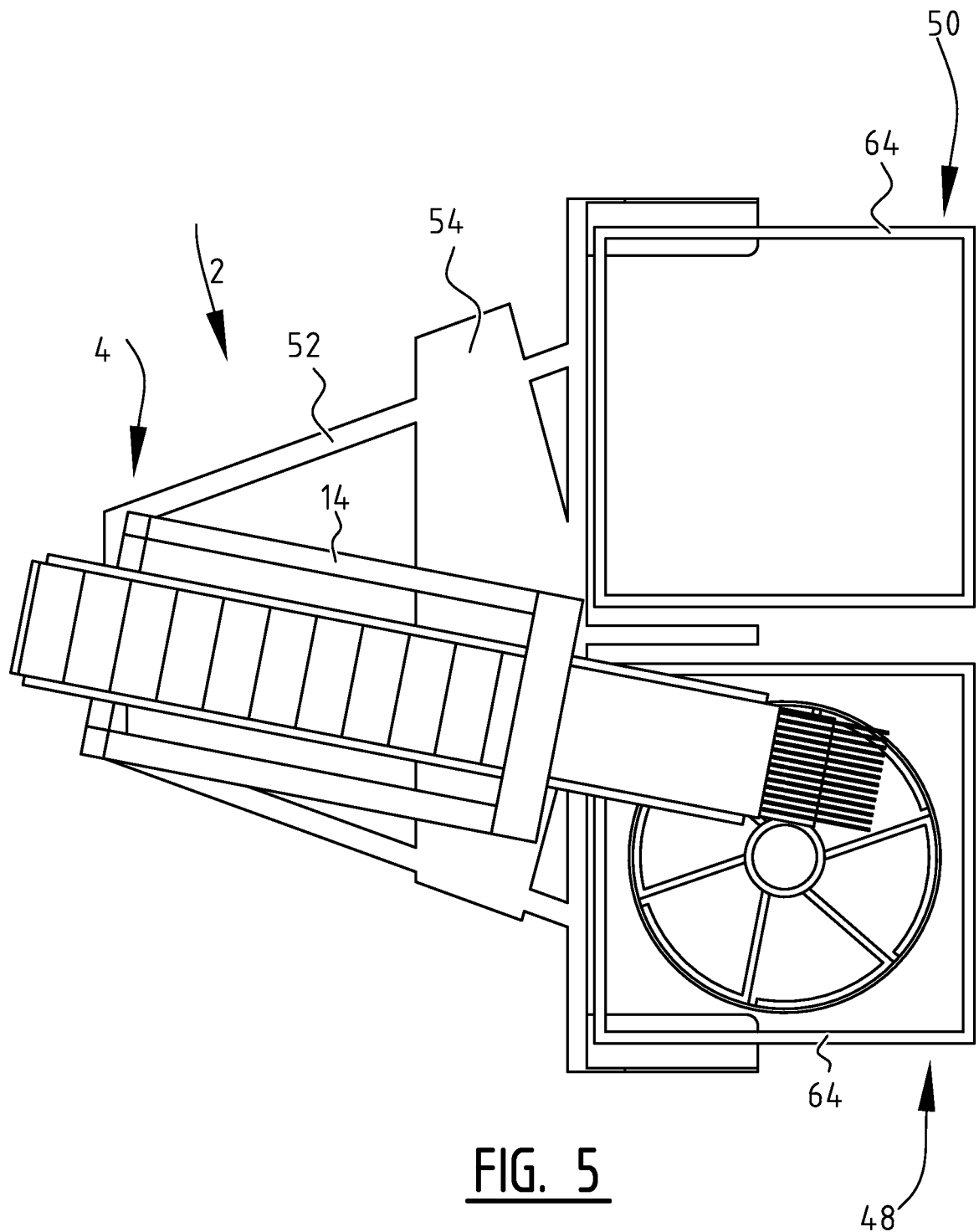
FIGS. 5 and 6 are schematic top views of a filling device with two filling positions.
Figure 6:
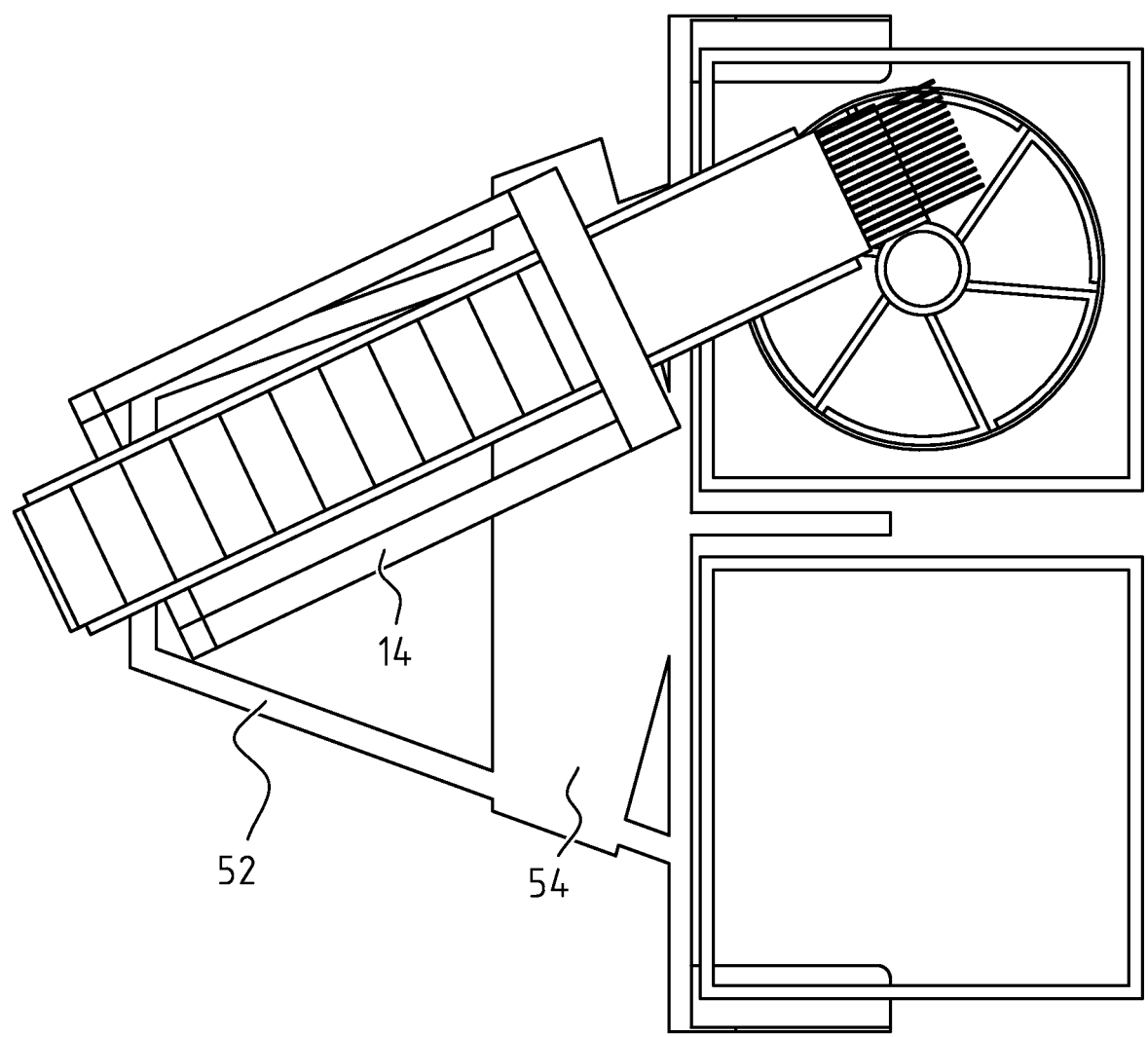
Figure 7A:
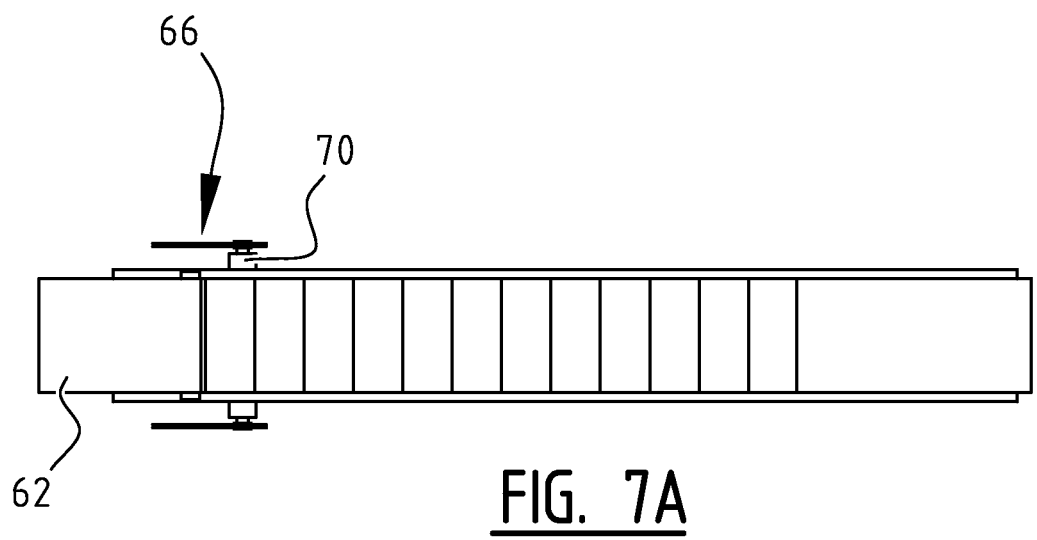
FIGS. 7A-B and 8A-B show views of the supply side guide of the filling device of FIG. 1 in different positions.
Figure 7B:
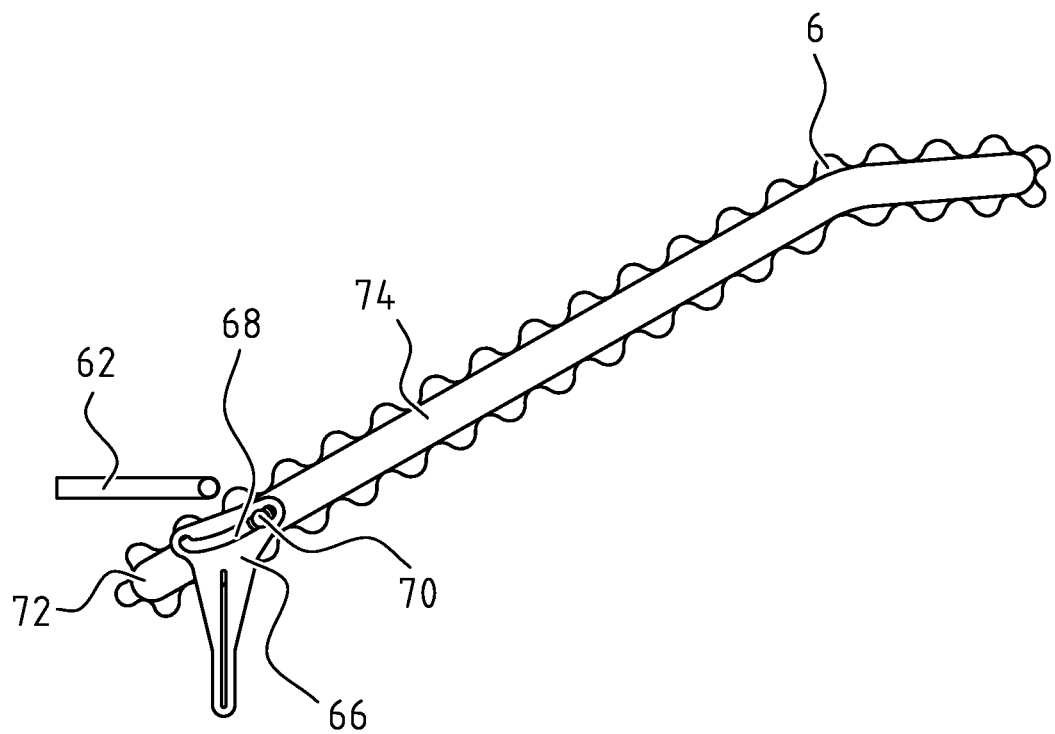
Figure 8A:
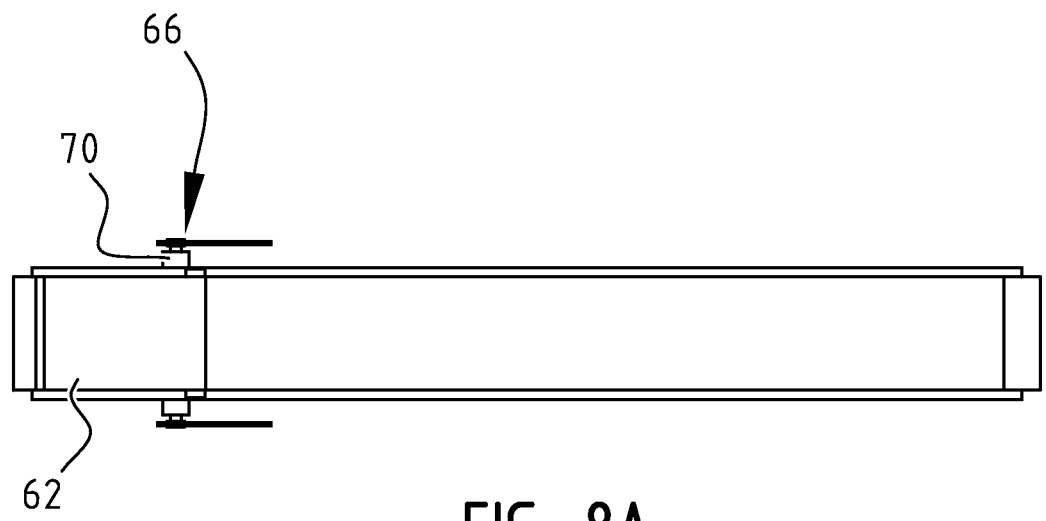
Figure 8B:
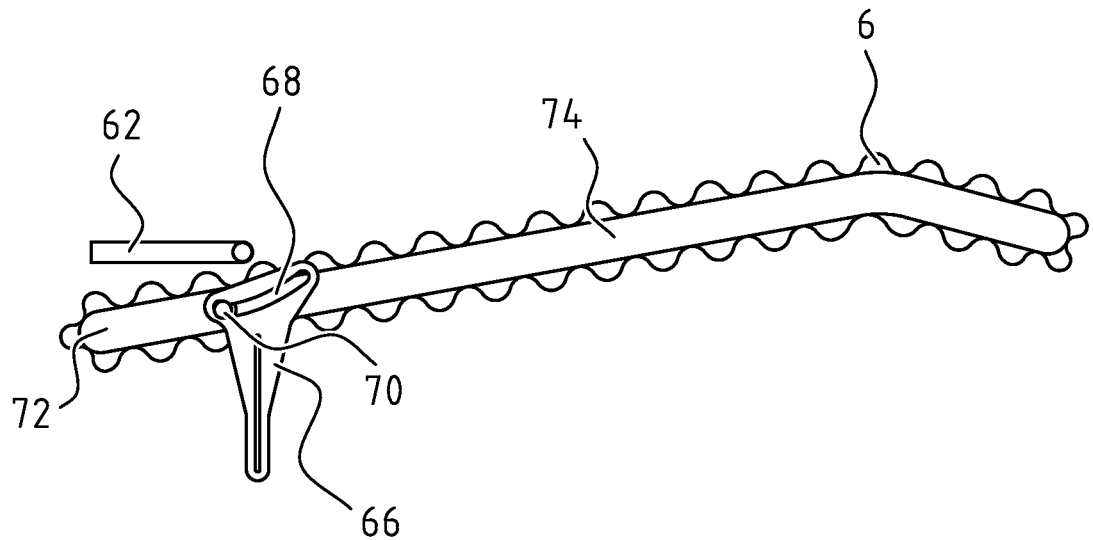

In the shown embodiment distributing device 28 of filling device 2 is movable between a first filling position 48 and a second filling position 50 (see among others FIGS. 5 and 6). The height of frame 14 amounts in a practical embodiment to about 2 to 2.5 m. The width of filling device 2 in an embodiment with a single filling position 48 amounts to about 1 to 1.5 m and to about 2 to 4 m in an embodiment with double filling position 48, 50. The overall length as seen in the direction of movement of product P amounts to about 2 to 4 m. Dimensions and number of filling positions 48, 50 can be adapted to the practical conditions of the specific application.

When the supply system with feed conveyor 62 supplies product P, it will be transferred to elevator conveyor 4 and, in the shown embodiment, be carried via brush 26 to distributing device 28 with first distributing disc 30 and second distributing disc 36. Products are placed on flaps 34 connected to spokes 32 of first distributor 30. Using flaps 34 the products are then placed in holder 64 via opening 38 in second disc 36. After preferably a layer of products P has been placed in case 64, distributing device 28 will be moved with filling side 12 of conveyor 4 upward in portal 42 of main frame 14. During the movement of distributing device 28 in the height the filling process preferably continues normally. Once case 64 has been filled, case 64 is removed from first filling position 48. A new case is then placed at this first filling position 48. Depending on the embodiment of filling device 2, distributing device 28 is then carried into this case 64, or distributing device 28 is carried to second filling position 50 where another case 64 already stands waiting for filling. Ultrasonic sensor 65 is optionally provided for the purpose of measuring the filling height of case 64.

Because of the movement of filling device 28 in the height filling side 12 of conveyor 4 is preferably also moved in the height using drive 46. In the shown embodiment supply side 10 of conveyor 4 does not rotate around a fixedly disposed shaft, but around movable shaft 70 instead. Provided in the shown embodiment of filling device 2 on supply side 10 of conveyor 4 is a guide track 68 for guiding shaft 70, and thereby the movement of supply side 10 of conveyor 4, during movement of filling side 12 in the height. Guide track 68 provides an optimum alignment here between supply side 10 of conveyor 4 and the delivery point of feed conveyor 62.

Using detector 60 supply controller 56 detects the arrival of product P close to the transition between feed conveyor 62 and elevator conveyor 4. During the activated filling process elevator conveyor 4, just as feed conveyor 62, will preferably operate continuously in order to reach an optimal capacity and avoid the risk of damage to products. During positioning of distributing device 28 relative to holder 64, particularly during removal of a filled case 64 and/or placing of a new case 64 for filling, conveyor 4 is brought to a stop using supply controller 56 if no product P is detected with detector 60. Feed conveyor 62 can if desired continue to run. As soon as a product 60 is detected close to the transition between feed conveyor 62 and elevator conveyor 4, elevator conveyor 4 is moved over a short distance in order to be able to receive product P. Products P are hereby buffered on elevator conveyor 4 until distributing device 28 is ready for further filling of case 64.

The present invention is by no means limited to the above described preferred embodiments thereof. The rights sought are defined by the following claims, within the scope of which many modifications can be envisaged. Other types of conveyor can thus be provided for instance instead of corrugated belt 6 for conveyor 4.

The invention claimed is:

1. A filling device for filling a holder with vulnerable products, comprising:
   a main frame provided with an elevator conveyor with a supply side and a filling side;
   a distributing device connected operatively to the filling side of the elevator conveyor and provided with one or more distributors configured to distribute products over the holder;
   a height adjuster configured to move the distributing device in a height relative to the holder such that the distributing device is movable in the height during filling of the holder; and
   a supply side guide arranged on the main frame for operation with the height adjuster and configured to align the supply side of the elevator conveyor with a delivery end of a feed conveyor during movement of the distributing device in the height,
   wherein the supply side guide comprises a curved guide track which is configured such that a distance between the delivery end of the feed conveyor and the supply side of the elevator conveyor remains substantially constant during a filling process, and
   wherein the elevator conveyor extends from opposite sides of the supply side guide.

2. The filling device of claim 1, wherein the height adjuster is configured to move together in the height the distributing device and the filling side of the elevator conveyor in or on the main frame.

3. The filling device of claim 2, wherein the height adjuster comprises a guide track arranged on the main frame and a drive.

4. The filling device of claim 1, wherein the supply side guide is located between a first end and a second end of the elevator conveyor, and wherein a length of the elevator conveyor disposed on each side of the supply side guide changes during a process of aligning the supply side of the elevator conveyor with the delivery end of the feed conveyor during movement of the distributing device in the height.

5. The filling device of claim 1, further comprising a supply controller provided with a product detector and configured to control the elevator conveyor during positioning of the distributing device relative to a holder which has been filled or is yet to be filled such that the elevator conveyor fulfills a buffer function.

6. The filling device of claim 5, wherein the supply controller is configured to additionally control the distributing device such that the distributing device fulfils an additional buffer function.

7. The filling device of claim 1, further comprising a first filling position and a second filling position.

8. The filling device of claim 7, further comprising a substructure over which the main frame is movable in a direction substantially transversely of the direction of movement of the products on the elevator conveyor such that the distributing device is displaceable from a first holder in the first filling position to a second holder in the second filling position.

9. The filling device of claim 1, further comprising a number of wheels for displacing the filling device.

10. The filling device of claim 1, further comprising an ultrasonic sensor configured to determine a filling height of the holder.

11. A method for filling a holder with vulnerable products, the method comprising:
   providing the filling device as claimed in claim 1;
   placing the holder;
   supplying the products with a feed conveyor;
   filling the holder, wherein the distributing device is moved in a height direction during the filling and wherein during movement of the distributing device in the height direction the positions of the supply side of the elevator conveyor and the delivery end of a feed conveyor are aligned using the supply side guide; and
   controlling the elevator conveyor with a supply controller such that the elevator conveyor functions as buffer.

12. The method as claimed in claim 11, wherein an alignment is such that a distance between the delivery end of the feed conveyor and the supply side of the elevator conveyor remains substantially constant during filling of the holder.

13. The method as claimed in claim 11, wherein the elevator conveyor functions as a buffer such that the feed conveyor can continue to operate for a determined time for the purpose of delivering products and the distributing device can be moved between a first filling position and a second filling position and/or the holder can be replaced.

14. The method as claimed in claim 12, wherein the elevator conveyor functions as a buffer such that the feed conveyor can continue to operate for a determined time for the purpose of delivering products and the distributing device can be moved between a first filling position and a second filling position and/or the holder can be replaced.

15. A filling device for filling a holder with vulnerable products, comprising:
   a main frame provided with an elevator conveyor with a supply side and a filling side;
   a distributing device connected operatively to the filling side of the elevator conveyor and provided with one or more distributors configured to distribute products over the holder;
   a height adjuster configured to move the distributing device in a height relative to the holder such that the distributing device is movable in the height during filling of the holder; and
   a supply side guide arranged on the main frame for operation with the height adjuster and configured to align the supply side of the elevator conveyor with a delivery end of a feed conveyor during movement of the distributing device in the height, wherein the height adjuster is configured to move together in the height the distributing device and the filling side of the elevator conveyor in or on the main frame, and wherein the supply side guide comprises a curved guide track which is configured such that a distance between the delivery end of the feed conveyor and the supply side of the elevator conveyor remains substantially constant during a filling process,
   wherein the elevator conveyor extends from opposite sides of the supply side guide.

16. The filling device of claim 15, wherein the height adjuster comprises a guide track arranged on the main frame and a drive.

17. The filling device of claim 15, wherein the supply side guide is located between a first end and a second end of the elevator conveyor, and wherein a length of the elevator conveyor disposed on each side of the supply side guide changes during a process of aligning the supply side of the elevator conveyor with the delivery end of the feed conveyor during movement of the distributing device in the height.

18. The filling device of claim 15, further comprising a supply controller provided with a product detector and configured to control the elevator conveyor during positioning of the distributing device relative to a holder, which has been filled or is yet to be filled, such that the elevator conveyor fulfills a buffer function.

19. The filling device of claim 15, further comprising a first filling position and a second filling position.

20. The filling device of claim 1, wherein the delivery end of the feed conveyor and the supply side of the elevator conveyor are separate structures that are movable independently of each other.

* * * * *